May 28, 1968 G. WALK 3,385,143

TURRET LATHE ADJUSTING STRUCTURE

Filed Dec. 27, 1965 3 Sheets-Sheet 1

May 28, 1968  G. WALK  3,385,143
TURRET LATHE ADJUSTING STRUCTURE
Filed Dec. 27, 1965

United States Patent Office 3,385,143
Patented May 28, 1968

3,385,143
TURRET LATHE ADJUSTING STRUCTURE
Georg Walk, Rheydt, Germany, assignor to A. Monforts Maschinenfabrik, Monchengladbach, Germany, a corporation of Germany
Filed Dec. 27, 1965, Ser. No. 516,358
Claims priority, application Germany, Dec. 30, 1964, M 63,657; Oct. 23, 1965, M 67,029
7 Claims. (Cl. 82—24)

ABSTRACT OF THE DISCLOSURE

In turret lathes with turrets having axes parallel to the spindle axis, an adjusting structure to adjust the indexed position of the turret for locating the tools accurately at their operating positions.

My invention relates to machine tools.

In particular, my invention relates to turret lathes and in particular to structure for adjusting turret lathes.

It is already known to provide turret lathes with rotary turrets capable of being releasably held in predetermined angular positions by means of an index pin received in one of a plurality of different sleeves carried by the turret, for example, for the purpose of releasably fixing and holding the turret at its different angular positions. A stationary index pin of this type guarantees that the operations performed on successive workpieces will be substantially identical. However, it is nevertheless necessary to use devices for making fine adjustments of the tools where extremely high accuracy is required.

In conventional machine tools of the above type the index pin is situated at relatively great distance from the axis of the rotary turret, so that where, for example, the tools are situated from the axis of the turret by a distance one half the distance of the index pin from the turret, it is possible to provide a highly accurate positioning of the several tools when they are successively located at operating positions. In machine tools of this type which are provided with play-free bearings for the spindle of the machine tool and highly reliable as well as play-free fixing of the several operating positions of the turret, it is possible to achieve fits on finished workpieces within a tolerance on the order of $\frac{1}{100}$ mm.

However, in the case where a machine tool of this latter type is used to carry out the same adjustment of a given tool for a relatively large number of workpieces one after the other, then there takes place at the tool, particularly if it is a cutting tool in the form of a tool bit, a wearing away of the cutting edges which requires readjustment of the tool. Such subsequent adjustment of a tool generally is on the order of only a fraction of a millimeter, but nevertheless the adjustment requires a considerable amount of time because the tool must be very accurately adjusted on the turret as well as on the carriage which carries the tool, before the operations are again started. A relatively large number of intermediate adjustments and checking of the adjustments are required before the final adjusted position is satisfactorily achieved. Thus, the time during which the productive operation of the machine tool is interrupted under these conditions, and of course the loss of output, is considerable.

It is accordingly a primary object of my invention to provide for a turret lathe a structure which enables the work and tools to be adjusted relative to each other with the desired accuracy but in a simple expedient manner which very greatly reduces the time required to effect a highly accurate adjustment while at the same time greatly reducing the inconveniences involved with conventional machines.

In particular it is an object of my invention to provide an adjusting structure which carries out a fine adjustment which may be on the order of a few millimeters but which preferably is only a fraction of a millimeter on an element of the machine tool which conventionally has a stationary axis, so that by changing the location of this latter axis while maintaining its parallel relationship to other axes it is possible to achieve with my invention an extremely fine and accurate adjustment in a fraction of the time and with none of the inconvenience required by conventional machines.

It is furthermore an object of my invention to provide a structure which can operate automatically to bring about the required adjustment for each tool when it becomes situated at the working position in response to rotation of the turret.

Furthermore, it is an object of my invention to provide for a turret lathe of the type where the tools each move axially along a working stroke and then along a return stroke a structure which will automatically retract each tool away from the work during the return stroke of each tool to an extent sufficient to prevent contact of the work by the tool during its return stroke so that formation of undesirable scratches or grooves in the work resulting from riding of a cutting tool along a machine surface during the return stroke of the cutting tool are avoided with my invention.

The structure of my invention is particularly adapted for use with a turret lathe which has a rotary spindle carrying a work-supporting means which mounts a workpiece on the spindle for rotation therewith. This work-supporting means may take the form of a suitable chuck, for example. The machine also includes a rotary turret which has an axis parallel to that of the spindle axis and about which the turret turns for successively locating at working positions tools which are carried by the turret and which are angularly distributed about the turret axis. The turret has a plurality of locating means which are also angularly distributed about the turret axis in correspondence with the number and angular distribution of the tools, and all of these locating means respectively have axes which are parallel to each other and to the turret axis. In addition, the machine has an index pin which has an axis parallel to the spindle axis, and this pin is successively received by the plurality of locating means for successively determining the successive angular positions of the turret which will position the tools successively at operating positions for carrying out the desired sequence of operations on the workpiece. The spindle is driven so as to rotate the workpiece and during each operation the turret together with the tools are axially advanced along a working stroke where each tool moves parallel to the spindle axis along the workpiece while the latter rotates, and at the end of each operation the direction of movement of the turret is reversed so that it is displaced in the opposed direction along a return stroke back to its starting position. The rotary spindle, the rotary turret, the plurality of locating means, and the index pin all form a plurality of units. In accordance with my invention an adjusting means is operatively connected with at least one of these units for adjusting it with respect to the other units while maintaining the axes of all of the units parallel to each other, so that in this way it is possible to achieve the adjustments of the tool and work relative to each other in a highly precise but extremely rapid and convenient manner. Furthermore, with my invention an automatic means responds to location of the turret at the end of its working stroke for automatically retracting each tool from the work, through actuation of the adjusting means of my invention, to an extent sufficient to prevent engagement of the tool with the work during return of the turret along its return stroke, so that in this way undesirable formation of grooves or scratches in the work during the return of the tools is avoided. Moreover, while it is possible to operate the adjusting means of my invention by hand, particularly in combination with suitable highly accurate scales, it is also a feature of my invention to provide an automatic control structure which automatically controls the adjusting means for each tool carried by the turret so as to properly position the tool with respect to the work in a fully automatic manner.

My invention is illustrated by way of example in the accompanying drawing which form part of this application and in which.

Figure 1:
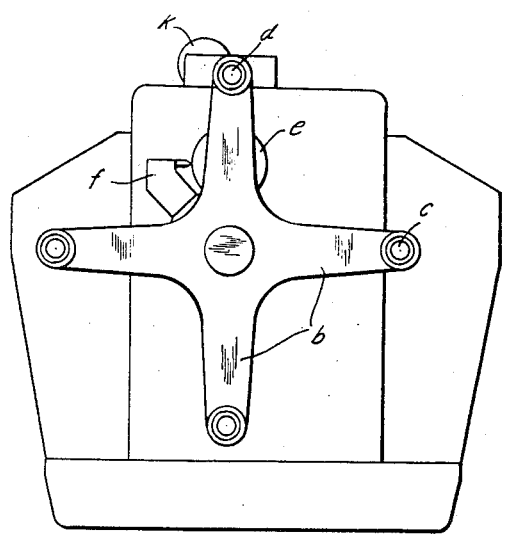
FIG. 1 is a schematic end view of a turret lathe provided with the structure of my invention, as seen when looking toward the turret of the machine tool.

Referring now to FIG. 1, the turret lathe illustrated therein includes in addition to a suitable framework on which all of the structure is mounted a rotary turret $a$ which is supported for rotation about its axis as well as for movement back and forth along its axis in a well known manner. The turret $a$ is provided with four turret arms $b$ extending radially from the axis of the turret and angularly distributed in a uniform manner about the turret axis so that in this way the turret will be turned through increments of 90° during changing from one operation to the next. The arms $b$ of the turret are provided at their outer ends with locating means $c$ in the form of elongated sleeves or bores which have parallel axes, and these axes of the locating means $c$ are not only parallel to each other but they are also parallel to the turret axis, which of course is also parallel to the spindle axis. The rotary spindle of the machine carries at its front end a work support means in the form of a suitable chuck, for example, and this chuck serves to mount a workpiece $e$ which is rotated together with the spindle about the spindle axis during operation of the machine tool. Of course, the spindle axis is parallel to the turret axis. During operation of the machine tool while the workpiece is rotated about the spindle axis the turret advances away from the viewer of FIG. 1 along a working stroke and at the end of the working stroke the turret returns back toward the viewer of FIG. 1 along a return stroke. The turret has distributed about its axis, at the same angular distribution as the turret arms $b$, a plurality of tools such as the tool carried by the tool holder $f$ indicated in FIG. 1. This tool holder can be a conventional support for a cutting tool in the form of a suitable tool bit such as is conventionally used on lathes for machining the outer surface of a workpiece during rotation thereof together with the spindle. The tool holding or support means $f$ thus fixedly carries a cutting tool which is diagrammatically indicated in FIG. 1 for the purpose of machining the exterior surface of the workpiece $e$ during the working stroke of the turret $a$.

The machine tool further includes an index pin $d$ which is successively received in the plurality of locating means $c$ for the purpose of determining the angular positions of the turret. The index pin $d$ also has an axis which is parallel to the axis of the spindle and the axis of the turret as well as the several axes of the plurality of locating means $c$. As the turret is turned through a new increment locating it in the next operating position in a well known manner the next sleeve $c$ becomes angularly aligned with the index pin $d$ and then the turret is advanced to a starting position where the pin $d$ is received in a sleeve $c$ so that in this way the turret will be maintained at a predetermined angular position during a given operation.

As has been indicated above it is conventional to carry out adjustments on the machines of the above type by adjusting, for example, the tool holding means $f$ so as to position a cutting tool with respect to the workpiece. These operations are extremely time consuming and do not always provide the desired accuracy. According to my invention the adjustments are carried out in a very fine and highly precise manner by adjusting part of the machine tool. Thus, the spindle of the machine, the turret of the machine, the several locating means $c$, and the pin $d$, all form separate units, and in accordance with my invention and adjusting means is operatively connected with at least one of these units for adjusting it with respect to the other units. It is to be noted that all of these units have parallel axes, and in accordance with my invention the adjusting means operates to carry out the adjustment while maintaining all of these axes parallel to each other.

Figure 3:
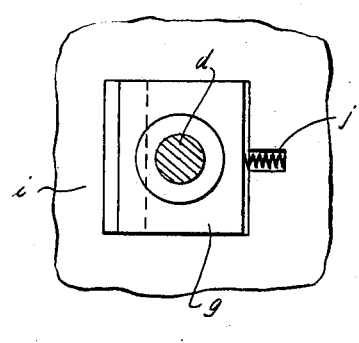
FIG. 3 is a partly sectional view taken along line 3—3 of FIG. 2 in the direction of the arrows and showing details of the structure of FIG. 2.
Figure 2:
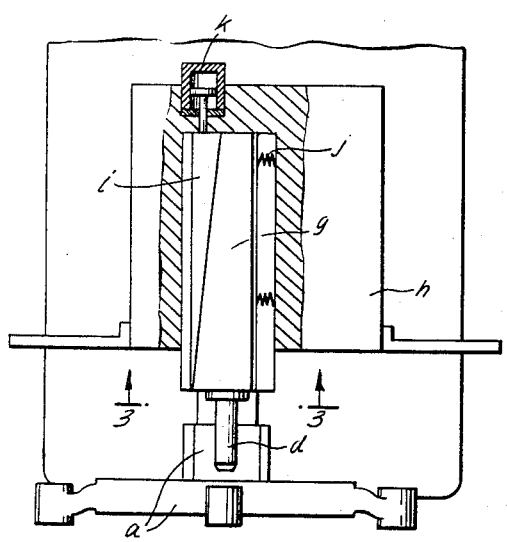
FIG. 2 is a schematic top plan view illustrating one possible embodiment of an adjusting means according to my invention.

In the particular example illustrated in FIGS. 2 and 3, the index pin $d$ forms the unit which is adjusted by the particular embodiment of the adjusting means of my invention which is schematically indicated in FIGS. 2 and 3. Thus, it will be seen that the index pin $d$ is fixedly carried by an elongated shaft $g$ which can form an integral extension of the index pin $d$ and which of course is coaxial with the index pin $d$. The machine frame is formed with a bore which receives the shaft $g$ with a very slight clearance which is only sufficiently great to provide the required extent of adjustment of the index pin $d$. This adjustment is in most cases so small that the maximum extent of adjustment made possible with my invention does not permit the adjustment to be visibly indicated in FIG. 3. However, the bore which received the shaft $g$ is given a configuration which will provide for substantially tangential movement of the axis of the pin $d$ with respect to the circle described by the parallel axes of the plurality of locating means $c$. Furthermore, it is to be noted that while the index pin $d$ is shown in the illustrated example at the uppermost part of the circle or cylinder described by the axes of the plurality of locating means $c$, it is perfectly possible to situate the index pin $d$ at any other location such as at the sides of the machine to cooperate with a sleeve $c$ carried by one of the horizontally extending arms $b$. Furthermore, the part of the machine which is formed with the bore which receives the shaft $g$ is also formed with an elongated groove extending parallel to the axis of this bore and communicating with the bore, so that this groove has a construction similar to that of a keyway. In this groove are located a plurality of springs $j$ which engage the shaft $g$ so as to tend to urge the latter to the left, as viewed in FIGS. 2 and 3. The side of the shaft $g$ which is opposed to the springs $j$ has an elongated flat surface portion situated in a plane which is inclined with respect to the common axis of the shaft g and the pin d, as is clearly apparent from FIG. 2. An elongated wedge member i is also situated in the bore which receives the shaft g, and this wedge member i has a mating flat surface portion which engages and lies flat against the flat surface portion of the shaft g. Therefore, during axial movement of the elongated wedge member i the position of the index pin d will be adjusted, and it is possible in this way to provide extremely precise adjustments of the machine tool in a highly convenient and rapid manner. Any suitable structure is provided for preventing axial movement of the shaft g so that it will remain in the axial position indicated in FIG. 2. Also, any suitable mechanical electrical, or fluid-pressure structure can be operatively connected to the adjusting element i in order to longitudinally adjust the latter, and in the illustrated example the member i is shown fixed to a piston rod which extends into a pressure cylinder k where it is connected to a piston which slides in this cylinder, and the cylinder k may communicate with any desired source of a fluid under pressure such as a suitable oil which is controlled so as to determine the axial position of the wedge member i in any one of a wide variety of different manners well known to those skilled in the art.

Figure 4:
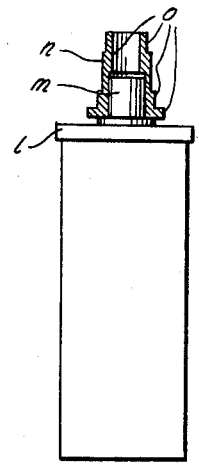
FIG. 4 is a schematic illustration of structure for supporting a workpiece during use of the latter in setting up the machine according to my invention.

Referring now to FIG. 4, there is illustrated therein a plate l mounted on a suitable stand and provided with a centering pin m. This pin m receives a control or master workpiece n which has four surfaces which must be machined, these surfaces o being indicated by the heavy lines in FIG. 4. The surfaces o of the workpiece are required to be machined within a tolerance of, for example, $\frac{1}{1000}$ mm., and of course with the structure of my invention it is possible to achieve this high degree of accuracy in a highly convenient manner.

In order to adjust the position of the index pin d with the adjusting means of my invention as described above and shown in FIGS. 1–3, the surfaces o on the control workpiece n will be measured with a known precise measuring instrument and the required measurements are transmitted to the drive means k which is operatively connected to the adjusting means i, g for acting on the latter to adjust the location of the index pin d. Thus, through the drive k, the adjusting means is actuated to provide a very precise adjustment of the position of the index pin d. The drive k or any part of the adjusting means i, g may be provided with a scale or other device for accurately indicating the adjusted position of the index pin d, and in this case the adjustment of the index pin can be carried out by hand. However, it is also possible to provide an automatic adjustment in a manner described in greater detail below. In this latter event the measuring structure will feel the workpiece at the surfaces o which are to be measured and in this way an impulse will be derived to be transmitted to the drive means k which will then automatically act on the adjusting means i, g so as to adjust the position of the index pin d, and of course in this event the transmission of the signal can take place electrically, although a hydraulic or pneumatic transmission is also possible, or even a mechanical transmission, and of course in the illustrated example the actual drive means k operates hydraulically.

It is thus apparent that with the structure described above the index pin is adjusted while its axis is maintained parallel to the axes of the spindle, the turret, and the several locating means c, respectively. Therefore, with the structure of the invention the index pin does not have a fixed axis, as is conventional, but rather an axis which is adjustable to a small extent, and the purpose of the index pin of my machine is not only to provide positioning of the turret in its operating positions with a minimum amount of play, but also to correct the position of the cutting tool, and in fact with my invention it is possible to use the index pin for the purpose of providing an extremely precise adjustment of the cutting tool at each of the operating positions of the turret.

Instead of an arrangement as described above and shown in FIGS. 1–3, it is of course possible simply to mount the index pin on a flanged element which is fastened to the machine by screws having fine threads which will permit an extremely fine and delicate adjustment of the location of the index pin to be made by shifting the flanged element which carries the index pin. However, such an arrangement will not have the required rigidity. With the particular structure described above and shown in the drawings the index pin does have sufficient rigidity by being integral with or otherwise fixed to the relatively long shaft g which is situated in the bore of the machine frame. With the adjusting means i, g it is possible to provide a shifting of the index pin through any desired relatively small distances on the order of, for example, $\frac{1}{1000}$ mm. As was pointed out above the adjusting wedge elements, such as the element i or the element g, can be provided with a suitable scale for indicating the extent of adjustment.

Inasmuch as the index pin is situated, as is conventional, at the region of the outer ends of the arms of the rotary turret, the tools themselves are situated closer to the axis of the turret than the index pin. For example the radial distance of the tools from the axis of the turret may be one half the distance of the pin d, from the axis of the turret. Therefore, a shifting of the axis of the pin through a distance of $\frac{1}{100}$ mm. will provide an adjusting accuracy of a tool on the order of $\frac{5}{1000}$ mm. It is therefore apparent that with the structure of my invention through a relatively simple structure it is possible to obtain an accuracy of adjustment which heretofore could hardly be achieved.

Of course, if it should happen that the first of a series of workpieces is not machined to the required accuracy, then it is a simple matter to further adjust the machine of my invention to provide the desired accuracy of the adjustment.

Figure 5:
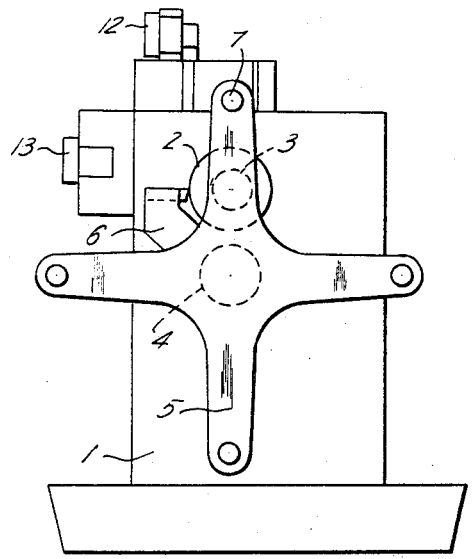
FIG. 5 is an end view similar to FIG. 1 of another embodiment of a machine tool, the embodiment of FIG. 5 being automatic.
Figure 6:
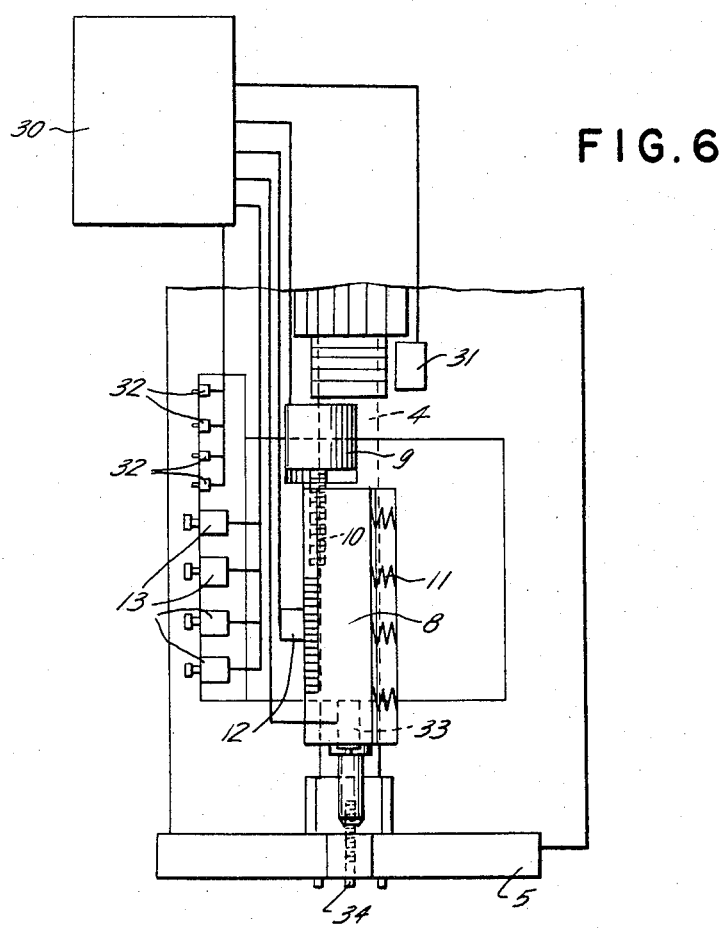
FIG. 6 is a top plan view of the structure of FIG. 5 showing in a schematic manner additional details of the automatic structure.

FIGS. 5 and 6 show a machine of my invention which is similar to that of FIGS. 1–3 except that the machine of FIGS. 5 and 6 is capable of being automatically adjusted. Thus, it will be seen that the machine of FIGS. 5 and 6 is provided with a suitable frame 1 which carries all of the various components. Suitable bearings which are carried by the machine frame 1 support for rotary movement the spindle 3 which carries at its front end a working-support means such as the chuck 2 on which a suitable workpiece is mounted. The turret is provided with an elongated turret shaft 4 which is also supported for rotation about its axis as well as for axial movement, and this shaft has its axis of course parallel to the axis of the spindle 3. Fixed to the turret shaft 4 are the several turret arms 5 which correspond to the turret arms referred to above. These arms carry at their outer ends sleeves which form a plurality of locating means also as indicated above. The plurality of locating means are adapted to successively receive the index pin 7 which corresponds to the pin d referred to above. Thus, the index pin 7 is capable of determining the successive operating positions of the turret.

During operation of the machine the turret 5 can be adjusted by using a suitable template or master workpiece which corresponds to the finished workpiece which is desired. The setting up of the machine with such a template or master workpiece is carried out with the several tools such as the cutting tool carried by the tool holder 6 diagrammatically indicated in FIG. 5. In the event that the adjustment of a given tool does not provide the required accuracy then the index pin 7 is adjusted in the manner described above in connection with FIGS. 1–3 so as bring about a corresponding correction as required. Thus, the index pin 7 is fixedly carried by an elongated shaft 8 which may be formed integrally with and which is coaxial with the index pin 7, this shaft 8 corresponding to the shaft g referred to above. As is apparent from FIG. 6, the shaft 8 is acted upon by springs similar to the spring j, and at its side opposed to the springs the shaft 8 is provided with an elongated flat surface situated in a plane inclined to the axis of the index pin 7 and the shaft 8. This flat surface portion is in turn engaged by a flat surface portion of an elongated wedge member corresponding to the wedge member i so that during axial movement of the wedge member the position of the axis of the pin 7 will be adjusted to produce the results referred to above in connection with FIGS. 1–3. In the example of FIGS. 5 and 6, however, instead of a hydraulic drive means, a mechanical drive means is provided, and this mechanical drive means takes the form of a screw-threaded spindle 10 provided with relatively fine threads and received in a mating threaded bore of the elongated adjustable wedge member. The screw member 10 is fixedly carried by the rotor of an electric motor 9 so that actuation of the electric motor 9 will bring about longitudinal displacement of the adjusting means and thus a correction in the position of the index pin. In order to provide an extremely high degree of accuracy in the adjusting of the index pin the slope of the flat surface portion of the shaft 8 is 1:100, for example. Therefore, the extent to which the index pin is shifted is, in this particular example, 1/100 of the extent of axial movement of the elongated wedge member. The springs 11 of course act to maintain the adjusted structure in its adjusted position.

The electric motor 9 is started and stopped by way of a switch unit 12 electrically connected through structure situated in the control box 30 with the four potentiometers 13, these four potentiometers being respectively provided for the four different positions of the turret. Therefore, it is possible to provide through the potentiometers 13 adjustments for the several positions of the turret, respectively. In addition, the switch device 12 is constructed in such a way that when the turret is turned to a new operating position the previously adjusted position is zeroed and a new correction is made for the new position of the turret. Furthermore, the switch control 12 is associated with a stop structure carried by the turret or with the control elements of the turret in such a way that at the end of a working stroke the index pin is shifted in a direction which displaces the cutting tool from the workpiece so that it will remain out of engagement with the workpiece during return of the turret to its starting position, and thus undesirable scratching or formation of grooves in the machined surface is reliably avoided.

The machine of FIGS. 5 and 6 is operated by a suitable drive which is connected with the spindle 3 so as to rotate the latter and thus rotate the workpiece held by the chuck 2. The turret 5 which carries the tools by way of tool holders such as the tool holder 6 is shifted parallel to the spindle axis first along a working stroke and then along a return stroke. At the end of the working stroke the automatic structure retracts the turret axially to its starting position, and during this latter retraction the tool is maintained out of contact with the work in the above-described manner through a suitable automatic adjustment of the index pin 7. When the turret 5 has been displaced to an extent sufficient to separate it from the index pin 7, the automatic structure turns the turret about its axis to situate the next tool in its operating position and the next locating means in a position to receive the index pin, whereupon the next operation takes place either with or without correction of the position of the index pin 7.

FIG. 6 shows, in addition to the adjustable potentiometers 13 and the switch control 12, as well as the control box 30, an end switch 31 which serves to participate in the control of the adjustment of the index pin and retraction of the cutting tool away from the workpiece during return of the turret to its starting position. This end switch 31 is situated in the region of the rear end of the turret shaft to cooperate with a conventional control drum which is carried by the turret shaft, as is well known in machines of this type. The actuation of the end switch 31 takes place through suitable switch cams which are carried by the control drum to engage the switch 31 so as to operate the latter to control the index pin.

In addition, FIG. 6 shows the selecting switches 32 for selecting the several operations when the cutting tool will be retracted from the work. Also, FIG. 6 shows a switch 33 which forms an end switch for determining the end of the working stroke of the turret. Each of the turret arms carries an adjustable screw 34 which at the end of a working stroke engages the switch 33 to actuate the latter and determine the end of the working stroke and the commencement of the return stroke of the turret. Thus, by adjusting the screw 34 on each arm of the turret it is possible to adjust the moment when the switch 33 will be actuated so as to determine the end of the working stroke of the turret.

The complete controls are situated within the control box 30 for adjusting the index pin 7 as well as for shifting the tool away from the work so as not to scratch or groove the work during the return stroke of the turret. In addition the control box 30 carries the structure which will provide selected operations and rotational control for the driving motor 9 of the adjusting means of my invention. By way of the end switch 31 the four operations of the turret are selected. The selecting switches 32 serve to select the operations for displacement of the tool away from the work. The end switch 33 signals the end of the working stroke and starts the operation of the structure which displaces the tool away from the work so as not to scratch or groove the work during the return stroke. The potentiometers 13 are adjusted so as to set the desired measurements of the workpiece into the machine and the control 12 is in the form of a potentiometer capable of registering the actual measurements of the work, so that by a comparison of the actual measurements with the desired measurements through a suitable follow-up or feed-back circuit (a bridge circuit), it is possible to provide automatic regulation of the motor 9 for producing an adjustment of the index pin which will automatically achieve workpieces having desired dimensions.

As was pointed out above, actuation of the switch 33 will bring about not only the initiation of the return stroke of the turret but also the movement of the tool away from the axis of the spindle through a distance sufficient to prevent engagement of the tool with the work during the return stroke of the turret. This removal of the tool away from the axis of the work is brought about by automatically connecting into the circuit, during the follow-up or feed-back control, a suitable resistance. In this way the extent of balancing of the bridge circuit is determined, and the index pin is always retracted by a predetermined amount.

Figure 7:
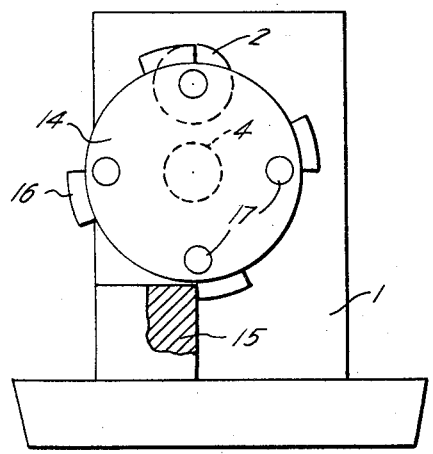
FIG. 7 is an end view schematically illustrating yet another embodiment of a turret lathe of my invention as seen when looking toward the turret end of the machine.

It is of course not essential that my invention be practiced with turrets which have radially extending arms. Thus, FIG. 7 shows a construction where a disc-shaped turret 14 is provided. The releasable holding of this turret in its four indicated angular positions is carried out by a stop means 15 which is fixedly carried by the machine frame. Through suitable corrections in the positions of adjustable stop members 16 which are directly carried by the rotary turret 14 it is possible to adjust the precise angular positions of the turret 14 for each of the tools carried thereby. The tool support means 17 at the several angular positions of the turret are schematically indicated in FIG. 7.

Of course, instead of bringing about corrections for the angular position of the turret by way of four adjustable stop elements 16 carried by the turret itself, it is possible instead to provide adjustments of the stop element 15, which is simpler because it is not necessary to duplicate the adjusting structure. Thus, the stop member 15 can be adjusted through a wedge-type of adjusting structure similar to that described above for the purpose of bringing about corrections similar to those achieved with the adjustment of the index pin, as described above.

Figure 8:
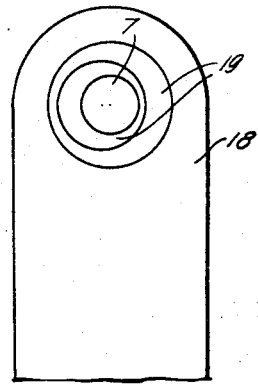
FIG. 8 is a fragmentary elevation illustrating yet another embodiment of an adjusting structure according to my invention.
Figure 9:
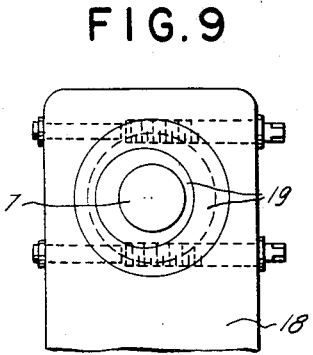
FIG. 9 is a view similar to FIG. 8 showing further details of the adjusting structure.
Figure 10:
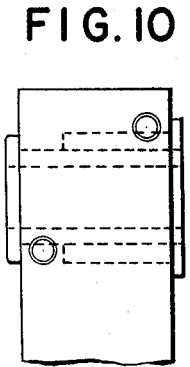
FIG. 10 is a view of the structure of FIG. 9 as seen from the left side of FIG. 9.

As was indicated above, the several locating means can also be used as the units for bringing about the desired adjustments, and in this case the adjusting means of my invention will be connected to the locating means. Such an arrangement is illustrated in FIGS. 8–10. In this case each turret arm 18 is provided at its outer end with a locating means which is adjustable. The index pin 7 will be fixed in this case and instead the locating means which receives the index pin will be adjusted. This locating means in the illustrated example takes the form, at each of the arms 18 of the turret, of a pair of eccentric sleeves 19 turnable one within the other. The turning of the eccentric sleeves can be indicated with a suitable scale, and in this way correction of the angular positions of the turret to an extent which is but a small fraction of a millimeter can be brought about very precisely. Of course, the adjusting structure, or the structure which drives the adjusting structure, is made in such a way that the adjusted positions of the sleeves 19 will be maintained during operation of the machine.

As may be seen from FIGS. 9 and 10, the sleeves 19 are of different lengths and are respectively provided at their exterior surfaces with worm-screw threads. Thus, the outer sleeve 19 is provided with a worm-screw thread cooperating with a rotary worm member illustrated at the upper right portion of FIG. 10 and at the upper portion of FIG. 9. The inner sleeve 19 extends rearwardly beyond the outer sleeve and at its portion which is situated beyond the outer sleeve is also provided with a worm thread mating with the thread of a rotary worm screw situated adjacent the other end face of the arm 18. The pair of rotary screws shown in FIGS. 9 and 10 are supported for rotation but prevented from axial movement in a well known manner, and they have at their outer end portions non-circular cross sections adapted to receive suitable wrenches or hand wheels or the like, such as a suitable crank, for example, for the purpose of providing manual adjustment of the locating means.

Figure 11:
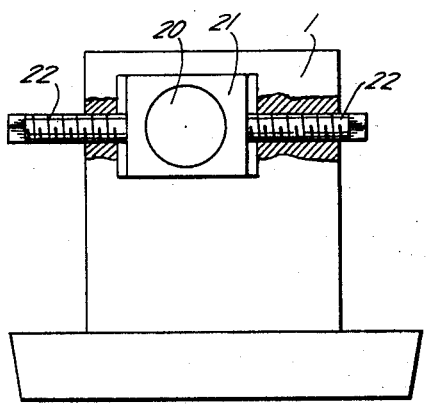
FIG. 11 is a schematic illustration of yet another embodiment of a machine tool of my invention, the embodiment of FIG. 11 providing adjustment of the spindle of the machine.

With the embodiment of my invention which is schematically illustrated in FIG. 11, the unit to which the adjusting means of my invention is operatively connected is the spindle itself. Thus, with this embodiment it is not the index pin or the locating means or the turret which is adjusted, but instead it is the spindle, and the adjustment is carried out in such a way that the spindle axis remains parallel to the other axes. As is schematically indicated in FIG. 11 the rotary spindle 20 is supported for rotation in one or more bearings 21 which are guided by the machine frame structure 1 for movement to the right and left, as viewed in FIG. 11. Of course, the chuck which is carried by the front end of the spindle 20 is not illustrated in FIG. 11. However, FIG. 11 does show screws 22 which have very fine threads and which are threadedly carried by the machine frame 1 with their ends engaging the opposed faces of the bearing or bearings 21 so that the positions of the bearings can be very precisely determined and thus the position of the axis of the spindle 20 can be very precisely determined. In this way the workpiece itself is adjusted relative to the tool for carrying out corrections in the adjustments to achieve the same results which are achieved with the embodiments of the invention referred to above. Of course, instead of relying upon finely threaded screws 22 it is possible to provide for the spindle 20 pairs of eccentric sleeves similar to the sleeves 19 so as to adjust the position of the spindle axis in this way also. Because of the relatively long length of the spindle, it will in general be supported for rotary movement adjacent its front and rear ends where adjusting screws 22 will be situated, and these screws can be coupled to each other at each side of the bearings 21 through a suitable transmission which enables actuation of one element to provide precisely the same degree of turning of the screws 22 at one or the other side of the bearings 21, so that in this way the parallel relationship between the spindle axis and the other axes will be reliably maintained.

As has been indicated above, even when a machine tool is properly set it will, after manufacturing of a relatively large number of identical pieces, provide sufficient wear on the cutting tools to require readjustment thereof, and with the structure of the invention it is possible to quickly achieve a precise readjustment under these conditions, whereas with conventional machines a considerable amount of time and loss of production results from the necessity of making the precise adjustments. Thus, with the structure of the invention it is possible to adjust the machine to an extent which is hardly visible to the operator so as to compensate, for example, for the extent of wear on the cutting tools. Thus, when adjusting the machine of my invention the operator need not, as is conventional, carry out a relatively large number of measurements and adjustments before the final position of the parts is achieved. Instead the adjustment is made with respect to a suitable master workpiece or template. In the event that during the operation of the machine there are differences between the achieved workpiece and the required measurements thereof, then it is possible with the structure of my invention to quickly and conveniently provide the necessary correction.

It is to be noted that in a practical machine constructed according to my invention and in which the index pin is adjustable in accordance with my invention, the extent of adjustment of the index pin was so small that absolutely no problems were encountered in receiving the index pin by the several sleeves at the ends of the arms of the turret, respectively. Thus, in one specific machine which has been constructed the axis of the index pin is situated from the axis of the turret by a distance of 525 mm., and the extent of adjustment of the index pin is on the order of ±0.5 mm. from a central position. As a result, the only possible extent of increase in the distance of the index pin from the turret assuming tangential movement of the index pin, as referred to above, is on the order of 0.00047 mm., so that the structure of my invention provides absolutely no difficulty with respect to cooperation of the parts in the usual way as a result of the adjustments carried out with the structure of my invention. Of course, it is possible to provide a structure where the index pin is adjusted with its axis describing part of a cylinder whose axis is coaxial with the turret axis. In this way any possible excess friction of the index pin in the sleeves at the ends of the turret arms will be reliably avoided. In addition, the sleeves at the ends of the turret arms can be made eccentric to compensate for any shifting of the index pin, as pointed out above, or the ends of the arms of the turret can be given a bifurcated configuration, or the sleeves can be elongated to have a slightly oval or elongated slot-shaped configuration, thus providing radially extending elongations capable of receiving the index pin. However, as has been indicated above such expedients are completely unnecessary because of the small extent of adjustment provided with the structure of my invention.

Furthermore, it is to be noted that the front free end of the index pin does not have a sharp edge at the intersection of the end face of the index pin with the cylindrical side surface thereof. These services intersect each other with a tapered, frustoconical transition surface which greatly facilitates receiving of the index pin in the several locating sleeves, so that in this way also any possible difficulty resulting from the adjustments of my invention are reliably avoided.

Of course, the adjusting elements are very fine. For example, in the case of the stop 15 shown in FIG. 7, suitable micrometer screws are provided to cooperate with the stop for adjusting the location thereof.

With the structure of my invention it is possible to very greatly reduce the time required for adjustment of the machine tool. The structure is of particular advantage with a turret lathe or other machine tool where successive tools are successively positioned with respect to the work so as to carry out successive operations one after the other on the same workpiece. With my invention it is possible to achieve corrections of adjustments to provide precise fits which normally would require extremely fine adjustment of a machine tool at the expense of a considerable amount of time and cost. In addition, a highly significant advantage of my invention resides in the fully automatic manner in which the adjusting structure can be actuated to retract the tool away from the work during the return stroke.

I claim:

1. In a turret lathe, a rotary spindle carrying a work-supporting means which supports a workpiece for rotation with said spindle about the spindle axis, a rotary turret having an axis parallel to said spindle axis and carrying a plurality of tool-supporting means for respectively supporting tools which work on a workpiece, said plurality of tool-supporting means being distributed about the turret axis and said turret carrying a plurality of locating means corresponding in a number of said plurality of tool-carrying means and having the same angular distribution about the turret axis, said plurality of locating means respectively having axes parallel to each other and to the turret axis and spindle axis, an index pin having an axis parallel to said spindle axis, said index pin being successively receivable in said plurality of locating means for determining successive angular positions of said turret so as to angularly position successive tools with respect to a workpiece, said spindle, said turret, said plurality of locating means, and said index pin respectively forming a plurality of units, and adjusting means operatively connected with said spindle unit for adjusting it with respect to the other units while maintaining all of said axes parallel to each other, for precisely adjusting the position of a tool with respect to a workpiece.

2. In a turret lathe, a rotary spindle carrying a work-supporting means which supports a workpiece for rotation with said spindle about the spindle axis, a rotary turret having a axis parallel to said spindle axis and carrying a plurality of tool-supporting means for respectively supporting tools which work on a workpiece, said plurality of tool-supporting means being distributed about the turret axis and said turret carrying a plurality of locating means corresponding in a number to said plurality of tool-carrying means and having the same angular distribution about the turret axis, said plurality of locating means respectively having axes parallel to each other and to the turret axis and spindle axis, an index pin having an axis parallel to said spindle axis, said index pin being successively receivable in said plurality of locating means for determining successive angular positions of said turret so as to angularly position successive tools with respect to a workpiece, said spindle, said turret, said plurality of locating means, and said index pin respectively forming a plurality of units, and adjusting means operatively connected with said turret unit for adjusting it with respect to the other units while maintaining all of said axes parallel to each other, for precisely adjusting the position of a tool with respect to a workpiece.

3. In a turret lathe, a rotary spindle carrying a work-supporting means which supports a workpiece for rotation with said spindle about the spindle axis, a rotary turret having an axis parallel to said spindle axis and carrying a plurality of tool-supporting means for respectively supporting tools which work on a workpiece, said plurality of tool-supporting means being distributed about the turret axis and said turret carrying a plurality of locating means corresponding in a number to said plurality of tool-carrying means and having the same angular distribution about the turret axis, said plurality of locating means respectively having axes parallel to each other and to the turret axis and spindle axis, an index pin having an axis parallel to said spindle axis, said index pin being successively receivable in said plurality of locating means for determining successive angular positions of said turret so as to angularly position successive tools with respect to a workpiece, said spindle, said turret, said plurality of locating means, and said index pin respectively forming a plurality of units, and adjusting means operatively connected with said index pin unit for adjusting it with respect to the other units while maintaining all of said axes parallel to each other, for precisely adjusting the position of a tool with respect to a workpiece, said adjusting means including an elongated shaft coaxial with and carrying said index pin, said shaft having an exterior flat surface portion situated in a plane inclined to the axis of said index pin and shaft, and an elongated adjusting element axially movable in a direction parallel to the axis of said index pin and having a flat surface in the same plane as and slidably engaging said surface portion of said shaft so that in response to axial movement of said adjusting element said shaft and said index pin therewith are adjusted to change the location of the axis of said index pin while maintaining said latter axis parallel to all of the other axes.

4. The combination of claim 3 and wherein a drive means is operatively connected with said adjusting means for actuating the latter and control means operatively connected to said drive means for actuating the latter to drive said adjusting means for automatically determining the position of the unit to which said adjusting means is operatively connected when said turret is successively turned to position successive tools with respect to a workpiece for operating on the latter.

5. The combination of claim 2 and wherein said turret is axially moved at each of its angular positions first along a working stroke and then back to a predetermined starting position along a return stroke, and automatic means responding automatically to location of said turret at the end of its working stroke for actuating said adjusting means to displace each tool to a location with respect to the workpiece where the tool does not engage the workpiece during the return stroke of the turret.

6. In a turret lathe, a rotary spindle carrying a work-supporting means which supports a workpiece for rotation with said spindle about the spindle axis, a rotary turret having an axis parallel to said spindle axis and carrying a plurality of tool-supporting means for respectively supporting tools which work on a workpiece, said plurality of tool-supporting means being distributed about the turret axis and said turret carrying a plurality of locating means corresponding in a number to said plurality of tool-carrying means and having the same angular distribution about the turret axis, said plurality of locating means respectively having axes parallel to each other and to the turret axis and spindle axis, an index pin having an axis parallel to said spindle axis, said index pin being successively receivable in said plurality of locating means for determining successive angular positions of said turret so as to angularly position successive tools with respect to a workpiece, said spindle, said turret, said plurality of locating means, and said index pin respectively forming a plurality of units, and adjusting means operatively connected with said plurality of locating means for adjusting it with respect to the other units while maintaining all of said axes parallel to each other, for precisely adjusting the position of a tool with respect to a workpiece, each of said locating means including a pair of eccentric sleeves one of which is situated within the other and said adjusting means including a pair of drives operatively connected to said sleeves of each locating means for rotating said sleeves about their common axis so as to change the location of said common axis while maintaining it parallel to all of the remaining axes.

7. The combination of claim 1, and said adjusting means including at least one screw member engaging a bearing in which said spindle is supported for rotary movement, and a guide for guiding said bearing and said spindle therewith in response to turning of said screw member while maintaining the spindle axis parallel to all of the remaining axes during a change in the location of said spindle axis in response to rotation of said screw member.

References Cited

UNITED STATES PATENTS 1,659,385  2/1928  Van Hamersveld ____ 82—17 XR
3,301,106  1/1967  Le Brusque _____ 82—21

LEONIDAS VLACHOS, *Primary Examiner.*